United States Patent
Chen et al.

(10) Patent No.: US 7,995,042 B2
(45) Date of Patent: Aug. 9, 2011

(54) FRAME ASSEMBLY FOR TOUCH SCREEN

(75) Inventors: Jung-Yu Chen, Taipei (TW); Chien-Ping Sun, Taipei (TW); Yi-Te Chien, Taipei (TW); Wei-Lin Wang, Taipei (TW)

(73) Assignee: ET&T Technology Co., Ltd., Taipei (TW)

( * ) Notice: Subject to any disclaimer, the term of this patent is extended or adjusted under 35 U.S.C. 154(b) by 781 days.

(21) Appl. No.: 12/104,460

(22) Filed: Apr. 17, 2008

(65) Prior Publication Data
US 2009/0262097 A1 Oct. 22, 2009

(51) Int. Cl.
*G06F 3/042* (2006.01)
(52) U.S. Cl. ............ 345/175; 345/173; 178/18.09; 178/18.11
(58) Field of Classification Search ........ 345/173–178; 178/18.09, 18.11, 20.01; 361/829
See application file for complete search history.

(56) References Cited

U.S. PATENT DOCUMENTS

| | | | | |
|---|---|---|---|---|
| 7,099,553 | B1 * | 8/2006 | Graham et al. | 385/146 |
| 7,781,722 | B2 * | 8/2010 | Lieberman et al. | 250/221 |
| 2007/0024598 | A1 * | 2/2007 | Miller et al. | 345/175 |
| 2007/0285406 | A1 * | 12/2007 | Kukulj et al. | 345/176 |
| 2008/0273019 | A1 * | 11/2008 | Deane | 345/176 |
| 2009/0200453 | A1 * | 8/2009 | Lieberman et al. | 250/208.2 |
| 2009/0262512 | A1 * | 10/2009 | Chen et al. | 361/829 |

* cited by examiner

*Primary Examiner* — Amare Mengistu
*Assistant Examiner* — Dmitriy Bolotin
(74) *Attorney, Agent, or Firm* — Leong C. Lei

(57) ABSTRACT

The dimension detection system is implemented in cascaded circuit boards housed inside a frame assembly of the touch screen. After the frame assembly is assembled and powered, the dimension detection system in the circuit boards would provide horizontal and vertical feedback signals which are utilized to obtain the size of the touch screen. The size information of the touch screen could then be provided to the computer or embedded system where the touch screen is connected, preventing troublesome manual configuration. The dimension detection system and the flexible frame assembly together make the touch screen's production, storage, transportation, and usage more efficient and friendly.

8 Claims, 5 Drawing Sheets

FRAME ASSEMBLY FOR TOUCH SCREEN

TECHNICAL FIELD OF THE INVENTION

The present invention generally relates to touch screens, and more particularly to a frame assembly for touch screens that could be easily assembled and disassembled.

DESCRIPTION OF THE PRIOR ART

Touch screens, due to their intuitive way of operation, have gained wide popularity these days. However, there are a large number of different sizes for touch screens. The most common dimensions include 32" (697×392 mm), 42" (930×523 mm), 46" (1018×572 mm), 52" (1152×648 mm), 56" (1244× 699 mm), 65" (1430×806 mm), etc. Conventionally, the panel and circuit boards of a touch screen are completely assembled in a frame in the factory before shipping to customers. To make these frames of various dimensions, significant costs in molds have to be invested. Additionally, with the frames, the touch screens take up more space and therefore a higher transportation and storage cost is incurred.

The present inventor has provided a frame assembly to solve the foregoing problem. However, the touch screens have an additional issue. Once a touch screen is connected to a computer, its dimension has to be manually configured in the computer, making the touch screen less convenient to use.

SUMMARY OF THE INVENTION

The primary purpose of the present invention is to provide an automatic dimension detection system for use along with an easy-to-assemble/disassemble frame assembly for touch screens.

The dimension detection system is implemented in cascaded circuit boards housed inside the frame assembly. After the frame assembly is assembled and powered, the dimension detection system in the circuit boards would provide horizontal and vertical feedback signals which are utilized to obtain the size of the touch screen.

The size information of the touch screen could then be provided to the computer or embedded system where the touch screen is connected, preventing troublesome manual configuration. The dimension detection system and the flexible frame assembly together make the touch screen's production, storage, transportation, and usage more efficient and friendly.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 3:
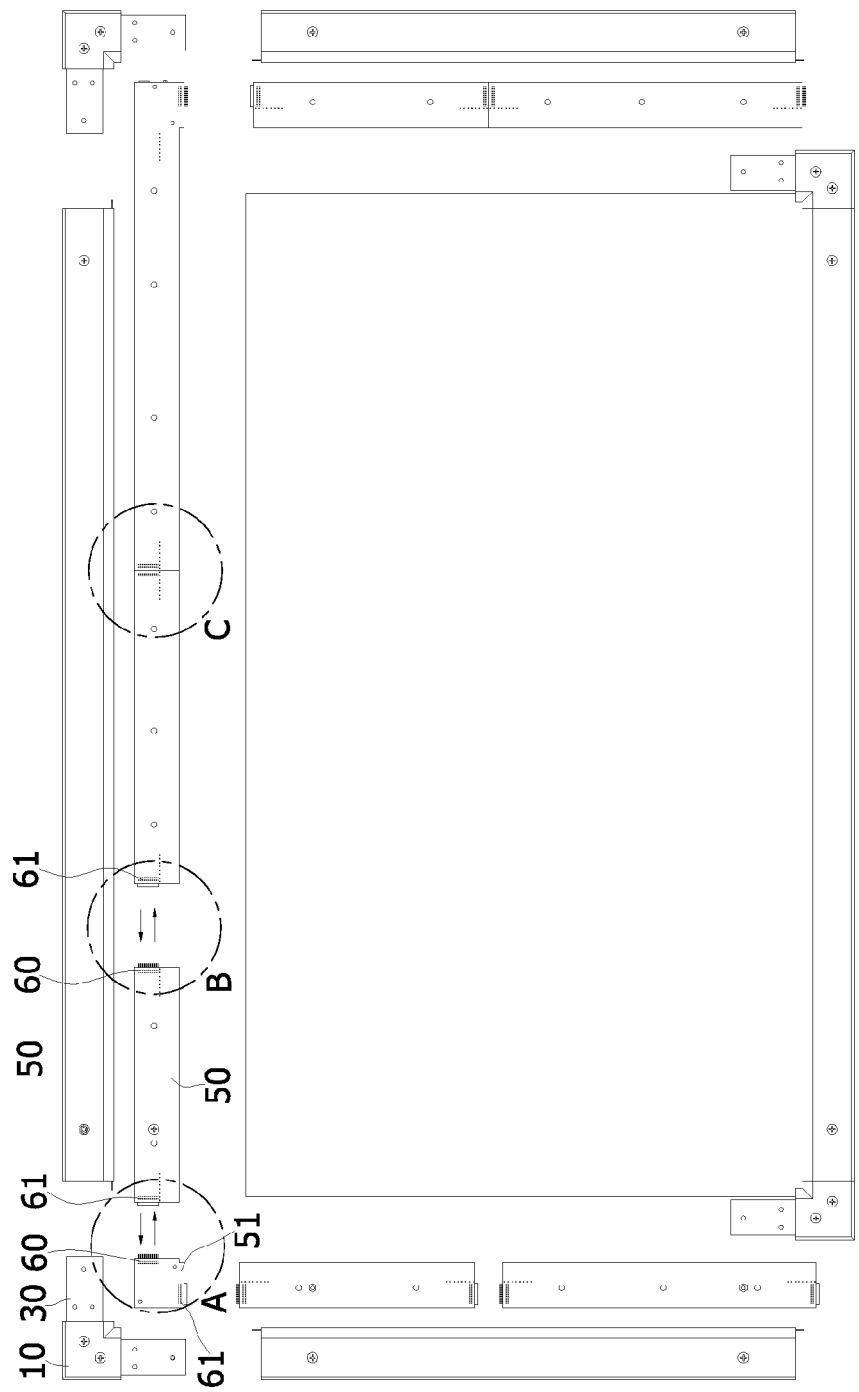
FIG. 3 is a front-view diagram showing the cascading of circuit boards of a frame assembly where the dimension detection system of FIG. 1 is implemented.
Figure 4:
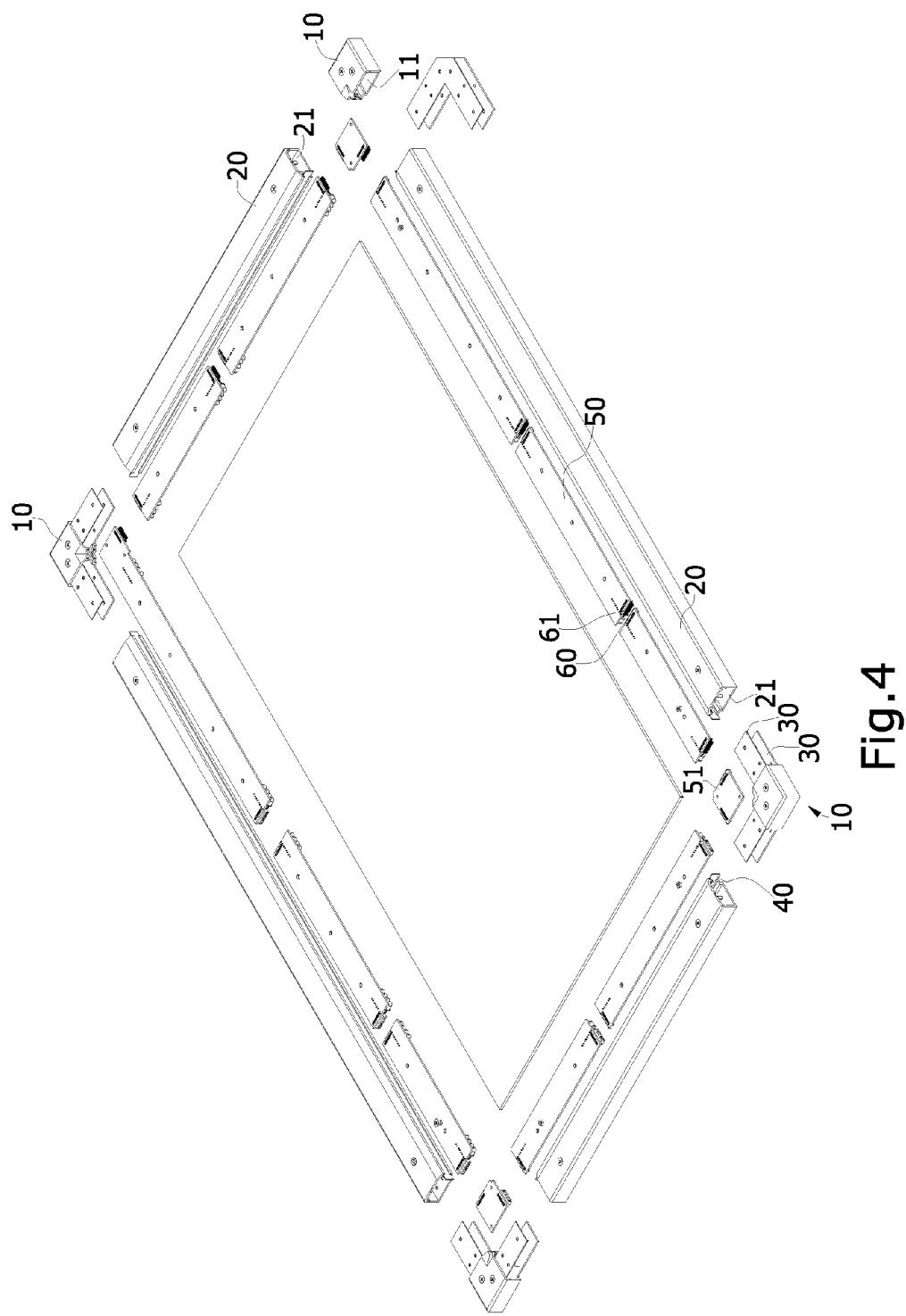
FIG. 4 is a perspective diagram showing the various components of a frame assembly where the dimension detection system of FIG. 1 is implemented.
Figure 5:
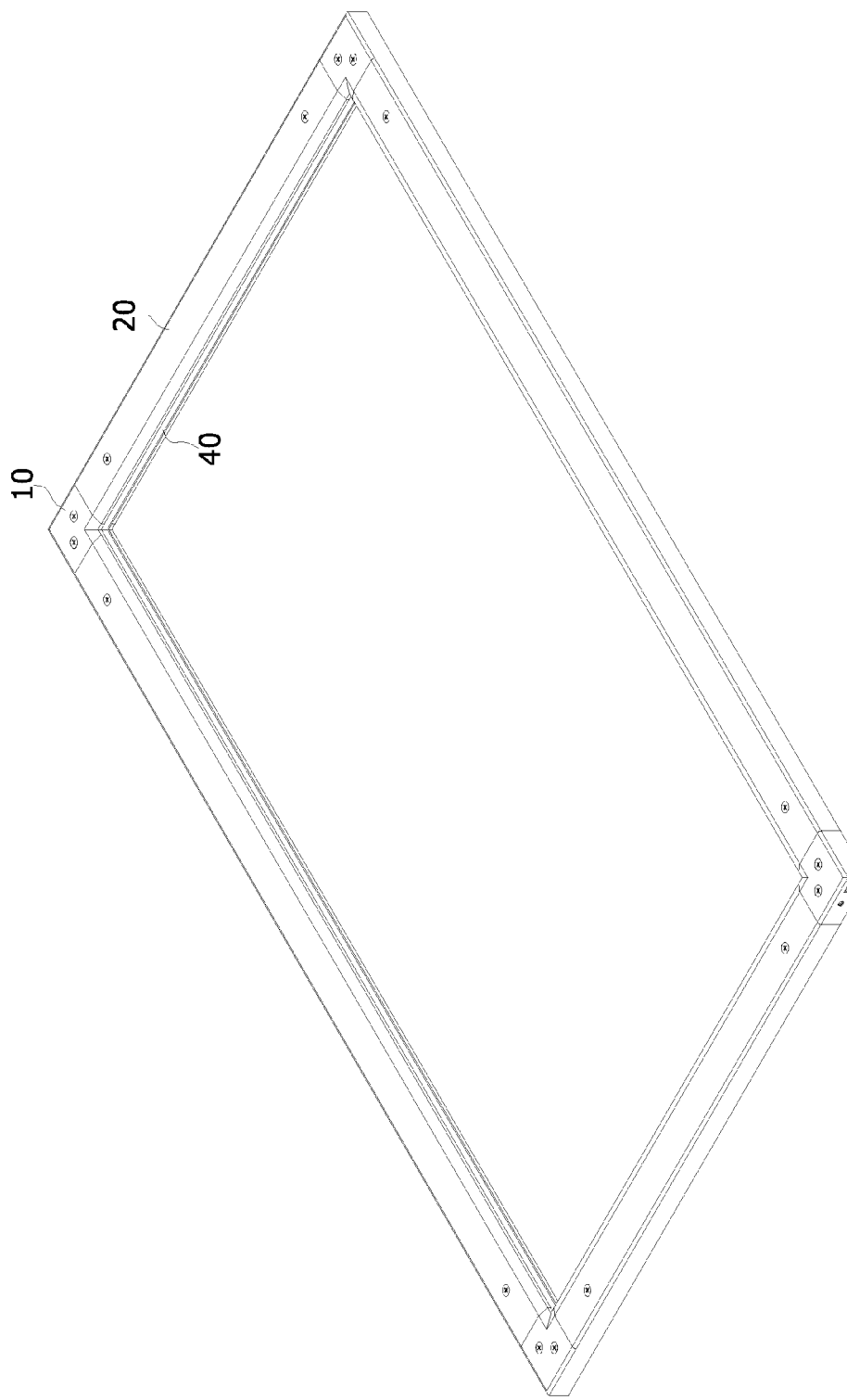
FIG. 5 is a perspective diagram showing a frame assembly where the dimension detection system of FIG. 1 is implemented.

As shown in FIGS. 3 to 5, a touch screen is framed by a frame assembly which mainly contains a number of linear edge members 20 and a number of L-shaped corner members 10 end-to-end joining the edge members 20 by a number of flat connection pieces 30 into a rectangular frame surrounding the touch screen.

Both the edge and corner members 20 and 10 have a C-shaped cross section with spaces 21 and 11 inside for holding circuit boards 51 and 50 of the touch panel and sealed by transparent plates 40. The circuit boards 50 and 51 of the corner and edge members 10 and 20 are aligned so that their connectivity by matching connectors 60 and 61 is easily established when putting the frame assembly together (as shown in the circles A, B, and C of FIG. 3).

The frame assembly described therefore could be easily adapted to accommodate touch screens of various dimensions. The dimension detection system of the present invention is implemented on the circuit boards 50 and 51 of the frame assembly so that, once the touch screen is framed and powered, its dimension is automatically detected by the dimension detection system of the present invention.

Figure 1:
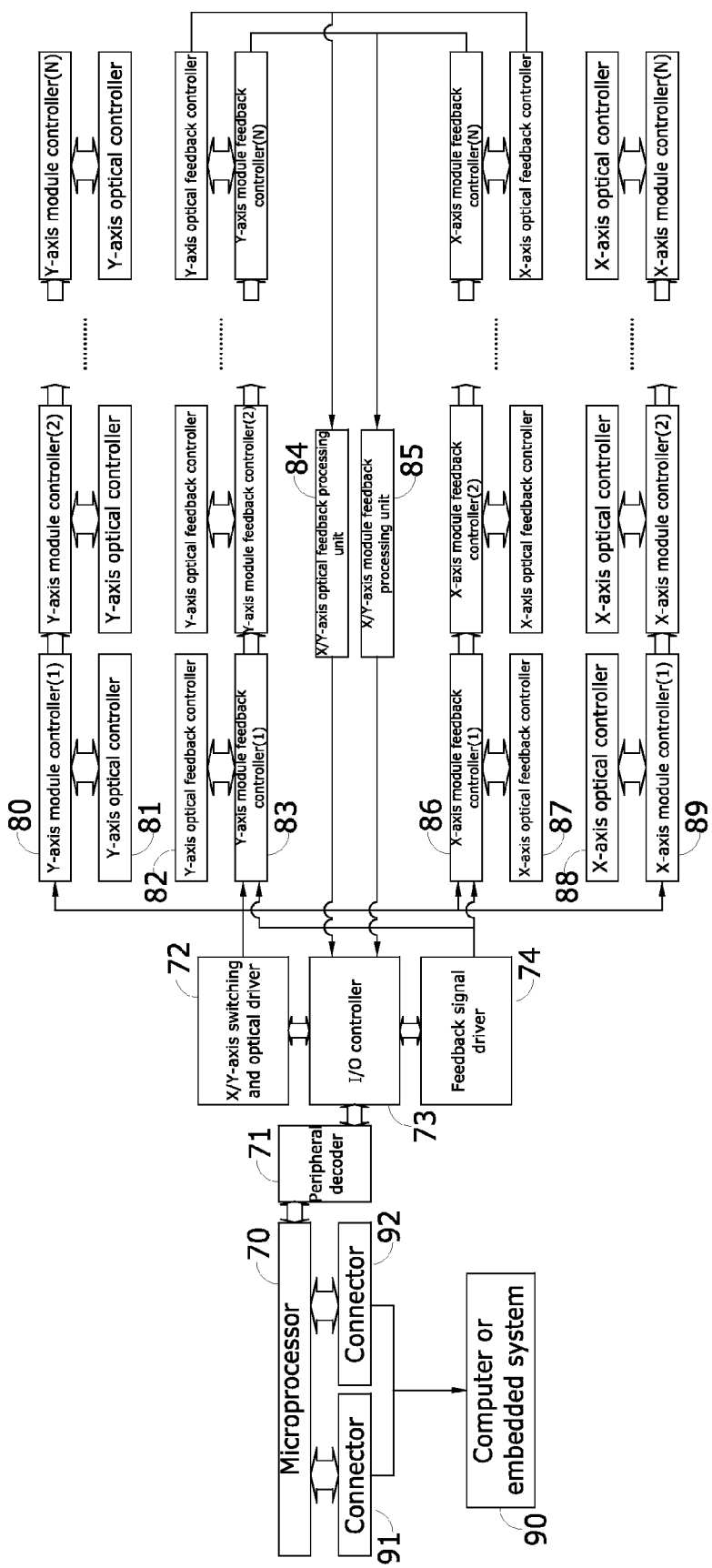
FIG. 1 is a functional block diagram showing a dimension detection system according to the present invention.

As shown in FIG. 1, the dimension detection system according to the present invention mainly contains the following components which are parts of the circuit boards 50 and 51.

There is at least a pair of Y-axis module controller 80 and Y-axis optical controller 81. As shown in FIG. 3, when there are multiple circuit boards 50 and 51 cascaded together vertically (i.e., along the Y-axis), there would be multiple pairs of Y-axis module controllers 80 and Y-axis optical controllers 81, as numbered in FIG. 1 as (1), (2), ..., (N). Each pair of the Y-axis module controller 80 and Y-axis optical controller 81 produces a position signal reflecting their position along the Y-axis.

There is at least a pair of Y-axis optical feedback controller 82 and Y-axis module feedback controller 83. As shown in FIG. 3, when there are multiple circuit boards 50 and 51 cascaded together vertically (i.e., along the Y-axis), there would be multiple pairs of Y-axis module feedback controllers 83 and Y-axis optical feedback controllers 82, as numbered in FIG. 1 as (1), (2), ..., (N). Each pair of the Y-axis module feedback controller 83 and Y-axis optical feedback controller 82 produces a feedback signal when being requested.

There is at least a pair of X-axis module controller 89 and X-axis optical controller 88. As shown in FIG. 3, when there are multiple circuit boards 50 and 51 cascaded together horizontally (i.e., along the X-axis), there would be multiple pairs of X-axis module controllers 89 and X-axis optical controllers 88, as numbered in FIG. 1 as (1), (2), . . . , (N). Each pair of the X-axis module controller 89 and X-axis optical controller 88 produces a position signal reflecting their position along the X-axis.

There is at least a pair of X-axis optical feedback controller 87 and X-axis module feedback controller 86. As shown in FIG. 3, when there are multiple circuit boards 50 and 51 cascaded together horizontally (i.e., along the X-axis), there would be multiple pairs of X-axis module feedback controllers 86 and X-axis optical feedback controllers 87, as numbered in FIG. 1 as (1), (2), . . . , (N). Each pair of the X-axis module feedback controller 86 and X-axis optical feedback controller 87 produces a feedback signal when being requested.

There is a pair of an X/Y-axis optical feedback processing unit 84 and an X/Y-axis module feedback processing unit 85. The X/Y-axis optical feedback processing unit 84 takes inputs from the last X-axis optical feedback controller 87 and the last Y-axis optical feedback controller 82. The X/Y-axis module feedback processing unit 85 takes inputs from the last X-axis module feedback controller 86 and the last Y-axis module feedback controller 83. The outputs of the X/Y-axis optical feedback processing unit 84 and an X/Y-axis module feedback processing unit 85 are fed to an input/output (I/O) controller 73.

The I/O controller 73 is also connected to an X/Y-axis switching and optical driver 72 and a feedback signal driver 74. The X/Y-axis switching and optical driver 72 is connected to the first X-axis and Y-axis module controllers 89 and 80, the first X-axis and Y-axis module feedback controllers 86 and 83. The feedback signal driver 74 is also connected to the first X-axis and Y-axis module feedback controllers 86 and 83.

The I/O controller 73 is further connected to peripheral decoder 71 which in turn is connected to microprocessor 70. The microprocessor 70 is responsible for the signal analysis and the determination of the touch panel's dimension. The dimension information could then be passed to a computer or an embedded system 90 via one of the connectors 91 and 92 (e.g., an USB connector or a RS232 connector).

Figure 2:
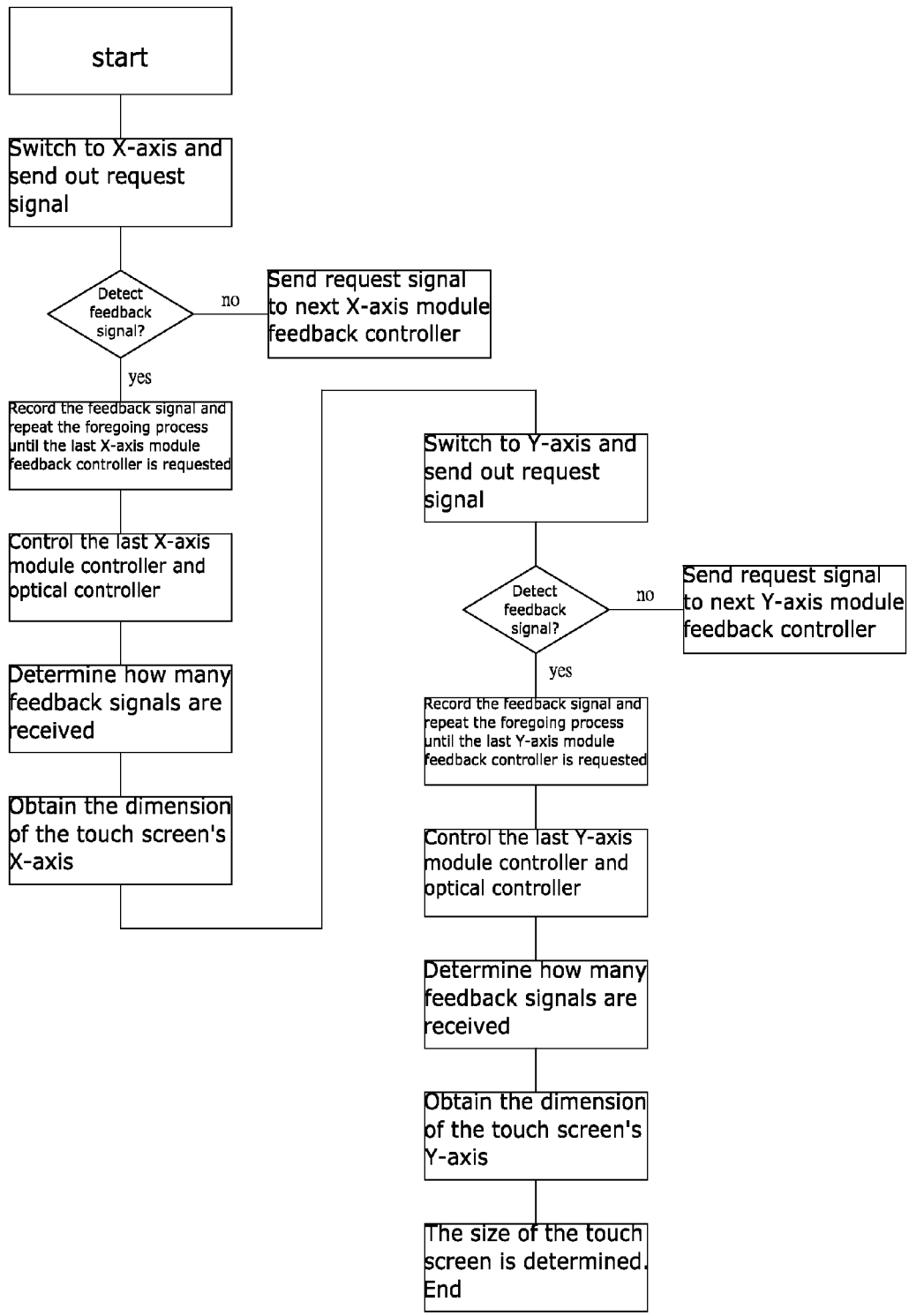
FIG. 2 is a flow diagram showing the operation of the dimension detection system of FIG. 1.

The operation of the dimension detection system is shown in FIG. 2. As illustrated, the X/Y-axis switching and optical driver 72 first switches to X-axis and issues a request signal to the first X-axis module feedback controller 86. If there is no feedback signal, the request signal is sent to the next X-axis module feedback controller 86. If there is a feedback signal, the feedback signal is recorded and the request signal is sent to the next X-axis module feedback controller 86. The process is repeated until the last X-axis module feedback controller 86 is requested. The X/Y-axis switching and optical driver 72 then controls the last X-axis module controller 89 and the last X-axis optical controller 88 and determines how many feedback signals are received from the X-axis optical feedback controllers 87. Using the known X-axis optical feedback controller and its feedback signal, the dimension of the touch screen's X-axis could be obtained. The approach is then applied to obtain the dimension of the touch screen's Y-axis. From the obtained dimensions of the X- and Y-axis, the size of the touch screen could be derived.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A dimension detection system for a frame assembly of a touch screen, comprising:
    at least a pair of Y-axis module controller and Y-axis optical controller capable of producing a Y-axis relative positional signal;
    at least a pair of Y-axis optical feedback controller and Y-axis module feedback controller capable of producing a feedback signal when being requested;
    at least a pair of X-axis module controller and X-axis optical controller capable of producing an X-axis relative positional signal;
    at least a pair of X-axis optical feedback controller and X-axis module feedback controller capable of producing a feedback signal when being requested;
    a pair of an X/Y-axis feedback processing units taking inputs from a last X-axis optical feedback controller, a last Y-axis optical feedback controller, a last X-axis module feedback controller, and a last Y-axis module feedback controller;
    an X/Y-axis switching and optical driver connected to a first X-axis and Y-axis module controllers, a first X-axis and Y-axis module feedback controllers;
    a feedback signal driver connected to a first X-axis and Y-axis module feedback controllers;
    an input/output controller connected to said X/Y-axis optical feedback processing unit, said X/Y-axis module feedback processing unit, said X/Y-axis switching and optical driver, said feedback signal driver;
    a peripheral decoder connected to said input/output controller; and
    a microprocessor connected to said peripheral decoder and a computer via at least a connector, said microprocessor performing signal analysis and obtaining X-axis and Y-axis dimensions of said touch screen which is passed to said computer via said connector.

2. The dimension detection system according to claim 1, wherein said pair of said X/Y-axis feedback processing units contains an X/Y-axis optical feedback processing unit and an X/Y-axis module feedback processing unit; said X/Y-axis optical feedback processing unit takes inputs from said last X-axis optical feedback controller and said last Y-axis optical feedback controller; said X/Y-axis module feedback processing unit takes inputs from said last X-axis module feedback controller and said last Y-axis module feedback controller.

3. The dimension detection system according to claim 1, wherein said connector is one of an USB connector and a RS232 connector.

4. A frame assembly for a touch screen, comprising a dimension detection system, a plurality of linear edge members and a plurality of L-shaped corner members end-to-end joining said edge members by a plurality of flat connection pieces into a rectangular frame surrounding said touch screen, said edge and corner members housing a plurality of circuit boards, said dimension detection system being implemented in said circuit boards and comprising:

at least a pair of Y-axis module controller and Y-axis optical controller capable of producing a Y-axis relative positional signal;

at least a pair of Y-axis optical feedback controller and Y-axis module feedback controller capable of producing a feedback signal when being requested;

at least a pair of X-axis module controller and X-axis optical controller capable of producing an X-axis relative positional signal;

at least a pair of X-axis optical feedback controller and X-axis module feedback controller capable of producing a feedback signal when being requested;

a pair of an X/Y-axis feedback processing units taking inputs from a last X-axis optical feedback controller, a last Y-axis optical feedback controller, a last X-axis module feedback controller, and a last Y-axis module feedback controller;

an X/Y-axis switching and optical driver connected to a first X-axis and Y-axis module controllers, a first X-axis and Y-axis module feedback controllers;

a feedback signal driver connected to a first X-axis and Y-axis module feedback controllers;

an input/output controller connected to said X/Y-axis optical feedback processing unit, said X/Y-axis module feedback processing unit, said X/Y-axis switching and optical driver, said feedback signal driver;

a peripheral decoder connected to said input/output controller; and a microprocessor connected to said peripheral decoder and a computer via at least a connector, said microprocessor performing signal analysis and obtaining X-axis and Y-axis dimensions of said touch screen which is passed to said computer via said connector.

5. The frame assembly according to claim 4, wherein said edge and corner members have a C-shaped cross section.

6. The frame assembly according to claim 4, wherein said circuit boards are cascaded by matching connectors.

7. The frame assembly according to claim 4, wherein said pair of said X/Y-axis feedback processing units contains an X/Y-axis optical feedback processing unit and an X/Y-axis module feedback processing unit; said X/Y-axis optical feedback processing unit takes inputs from said last X-axis optical feedback controller and said last Y-axis optical feedback controller; said X/Y-axis module feedback processing unit takes inputs from said last X-axis module feedback controller and said last Y-axis module feedback controller.

8. The frame assembly according to claim 4, wherein said connector is one of an USB connector and a RS232 connector.

* * * * *